June 2, 1936.  J H. HUNT  2,042,714
VEHICLE WHEEL
Filed Oct. 31, 1932
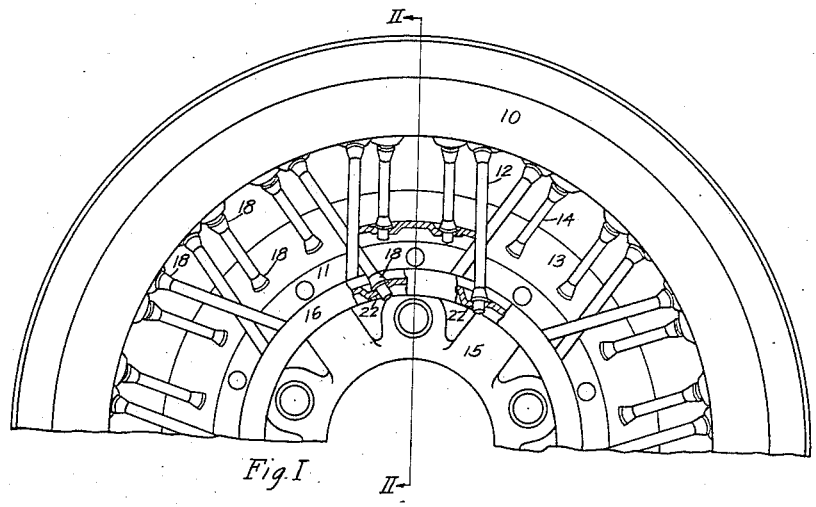
Fig. I
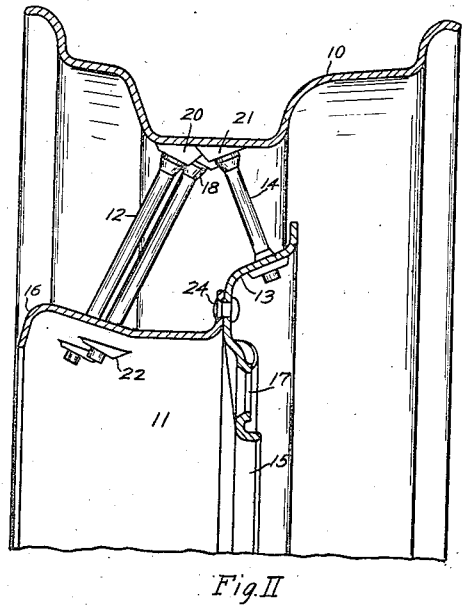
Fig. II
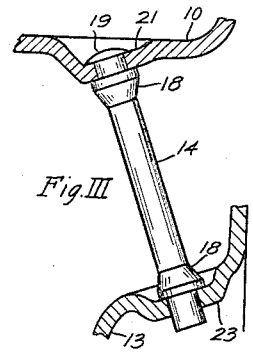
Fig. III
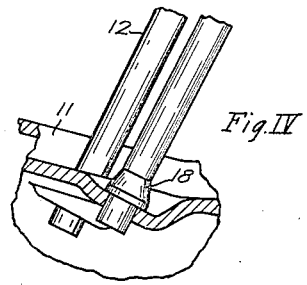
Fig. IV
INVENTOR.
J Harold Hunt.
BY Carroll R. Taber
HIS ATTORNEY.

Patented June 2, 1936

2,042,714

UNITED STATES PATENT OFFICE 2,042,714

VEHICLE WHEEL

J Harold Hunt, Lansing, Mich., assignor to Motor Wheel Corporation, Lansing, Mich., a corporation of Michigan Application October 31, 1932, Serial No. 640,413

2 Claims. (Cl. 301—62)

This invention relates to vehicle wheels and more particularly to vehicle wheels of the compression spoke type. The invention is designed primarily for wire spoke wheels but is equally applicable to any wheel of the compression type.

The present invention has for its principal object the provision of a novel construction for wire spoke vehicle wheels of the compression type and also the provision of a novel method of assembling the vehicle wheel whereby to place the spokes under compression. According to the present invention the hub shell of a vehicle wheel is made in two parts. Two series of spokes are positioned with their outer extremities abutting the wheel rim and their inner extremities inclined away from each other and abutting the respective parts of the hub shell. When the two parts of the hub shell are secured together in any suitable manner the spokes are held under compression and are securely locked in position.

Other objects of the invention and the nature thereof will appear from the following description taken in connection with the accompanying drawing in which:

Figure I is a partial elevation of a vehicle wheel embodying the present invention with portions broken away to illustrate the manner in which the spokes are secured in position.

Figure II is a cross sectional view taken on substantially the line II—II of Figure I.

Figure III is an enlarged fragmentary sectional view of the wheel shown in Figure I illustrating the manner in which the spokes are secured in position between the rim and the rear portion of the hub shell; and Figure IV is an enlarged fragmentary sectional view of the inner extremity of some of the spokes and the forward portion of the hub shell.

The vehicle wheel illustrated in the accompanying drawing consists of a rim 10 of the drop center type connected to the forward portion 11 of the hub shell by means of a series of relatively long spokes 12 and connected to the rear portion 13 of the hub shell by means of a series of relatively short spokes 14. The rear portion 13 of the hub shell is preferably formed integrally with a hub attaching flange 15. Any form of rim or felloe other than that shown in the accompanying drawing may be utilized without departing from the spirit of the present invention. The spokes 12 and 14 are preferably of the metal wire type but may, if desired, be replaced by any other type of wheel body adapted for use in a compression wheel.

The outer extremity of the forward portion 11 of the hub shell is provided with an inturned flange 16 which defines a central opening through the hub shell to which a removable hub shell cap may be attached in a conventional manner. A series of suitable openings 17 is provided in the hub attaching flange 15 for the reception of conventional securing bolts whereby the wheel may be removably connected to a hub flange.

The spokes 12 and 14 as illustrated in Figure III are provided adjacent their opposite extremities with annular shoulders 18. These shoulders may be formed integrally with the spokes or may be secured thereto in any desired manner. A head 19 is preferably formed at the outer extremity of the spokes 12 and 14.

Two series of depressions 20 and 21 are formed in the base of the rim 10. There is an opening formed substantially in the center of each of these depressions of slightly greater diameter than that of the spokes 12 and 14. The inner surface of these depressions surrounding the openings form seats for the shoulders 18 of the spokes 12 and 14.

It will be observed that the depressions 20 are formed whereby the seats surrounding the openings therethrough lie at an angle to the base of the rim 10 and are normal to the longitudinal axis of the spokes 12 while the plane of the seats about the openings through the depressions 21 are normal to the longitudinal axis of the spokes 14.

A plurality of depressions 22 are formed in the forward hub shell portion 11 corresponding in number to the depressions 20 formed in the rim 10. Each of the depressions 22 is provided with a central opening therethrough surrounded by a seat which lies in a plane parallel to the seat surrounding the opening in the depression 20 when the wheel is completely assembled. The rear hub shell portion 13 is likewise provided with a plurality of depressions 23 corresponding in number to the depressions 21 and which are also provided with central openings therethrough surrounded by seats lying in a plane parallel to the plane of the seats surrounding the depressions in the rim when the wheel is completely assembled.

In assembling the wheel the outer extremities of the spokes 12 and 14 are inserted through the openings formed in the depressions 20 and 21 respectively and are then preferably flattened in any suitable manner whereby to form the heads 19. The heads 19 serve only to hold the spokes in position during the assembling of the wheel.

They may be dispensed with and any other suitable means utilized for this purpose, if desired.

After the spokes 12 and 14 have been fastened in position with the shoulders 18 contacting the seats surrounding the openings formed in the depressions 20 and 21, the inner extremities of the spokes are inserted into the openings provided in the depressions 22 of the forward hub shell portion 11 and the depressions 23 of the rear hub shell portion 13. In order to place all of the inner extremities of the spokes 12 and 14 in the respective openings formed in the forward hub shell portion 11 and the rear hub shell portion 13 it is necessary that these portions of the hub shell be disposed in spaced relation to each other as the spokes are considerably longer than the space between these respective parts of the hub shell and the rim.

After the spokes 12 and 14 have been installed as just described the two portions 11 and 13 of the hub shell are pressed laterally toward each other and are preferably secured together by means of the rivets 24. In this manner the spokes 12 and 14 are placed under compression and securely locked in position with the shoulders 18 firmly engaging the seats surrounding the openings formed in the depressions 20, 21, 22 and 23.

The scope of the invention is indicated in the appended claims.

I claim:

1. A wheel comprising a rim and hub shell connected to each other by two axially spaced series of spokes, the spokes of one series being arranged in intersecting pairs and having their opposite extremities connected to front portion of the rim and hub shell, the spokes of the other series being arranged in spaced relation to each other and having their opposite extremities connected to the rear portion of the rim and hub shell, all of said spokes being of the compression type and having engagement with the rim and hub shell through seats disposed in planes perpendicular to their respective longitudinal axes.

2. A vehicle wheel comprising a rim and hub shell connected to each other by a plurality of spokes, said spokes being arranged in two separate axially spaced series, the spokes of one series being arranged in intersecting pairs and having their opposite extremities connected to the forward portions of the hub shell and rim in staggered relation, the spokes of the other series being arranged in circumferential alignment throughout their length and having their opposite extremities connected to rear portions of the rim and hub shell, all of said spokes being of the compression type and having engagement with the rim and hub shell through seats disposed in planes perpendicular to their respective longitudinal axes.

J HAROLD HUNT.